US011794790B2

(12) United States Patent
Ferris et al.

(10) Patent No.: US 11,794,790 B2
(45) Date of Patent: Oct. 24, 2023

(54) WIND TURBINE BLADE REACTION FIXTURE FOR RAILWAY TRANSPORT

(71) Applicants: John L. Ferris, Colleyville, TX (US); Andrew J. Sullivan, Bedford, TX (US); Allison L. Bowker, Dallas, TX (US)

(72) Inventors: John L. Ferris, Colleyville, TX (US); Andrew J. Sullivan, Bedford, TX (US); Allison L. Bowker, Dallas, TX (US)

(73) Assignee: BNSF Logistics, LLC, Springdale, AR (US)

( * ) Notice: Subject to any disclaimer, the term of this patent is extended or adjusted under 35 U.S.C. 154(b) by 577 days.

(21) Appl. No.: 17/082,546

(22) Filed: Oct. 28, 2020

(65) Prior Publication Data

US 2022/0126886 A1    Apr. 28, 2022

(51) Int. Cl.
*B61D 3/16* (2006.01)
*B61D 45/00* (2006.01)
*F03D 13/40* (2016.01)

(52) U.S. Cl.
CPC ............ *B61D 3/16* (2013.01); *B61D 45/00* (2013.01); *F03D 13/40* (2016.05); *F05B 2260/02* (2013.01)

(58) Field of Classification Search
CPC ........... B61D 3/16; B61D 45/00; F03D 13/40; F05B 2260/02
See application file for complete search history.

(56) References Cited

U.S. PATENT DOCUMENTS

| 7,591,621 | B1 | 9/2009 | Landrum et al. | |
| 7,670,090 | B1 | 3/2010 | Landrum et al. | |
| 7,967,536 | B2* | 6/2011 | Broderick | F03D 13/40 410/44 |
| 8,056,203 | B2* | 11/2011 | Madsen | F03D 13/40 29/407.09 |
| 8,641,339 | B2* | 2/2014 | Schibsbye | F03D 13/40 410/45 |
| 8,708,625 | B1* | 4/2014 | Landrum | B60P 3/40 410/44 |
| 8,834,082 | B1* | 9/2014 | Landrum | B61D 3/16 410/45 |
| 9,315,200 | B1 | 4/2016 | Landrum et al. | |
| 9,347,426 | B2 | 5/2016 | Landrum et al. | |
| 9,638,162 | B1* | 5/2017 | Fletcher | B60P 1/6409 |
| 9,790,927 | B1 | 10/2017 | Landrum et al. | |
| 10,738,766 | B2* | 8/2020 | Fletcher | B61D 45/003 |
| 11,333,130 | B2* | 5/2022 | Ferris | B60P 7/12 |
| 11,698,054 | B2* | 7/2023 | Jensen | B61D 47/00 414/809 |

(Continued)

*Primary Examiner* — Eldon T Brockman
(74) *Attorney, Agent, or Firm* — Dan Brown Law Office; Daniel R. Brown (57) ABSTRACT

A fixture system for rail transport of wind turbine blades upon a consist of flatcars using a root-support fixture, a blade-support fixture, and first and second guide post that intermittently engage the tip-end portion of the wind turbine blade to limit lateral movement thereof, such that movement of the consist around a curved railway section urges the wind turbine blade against the first or second guide posts, which urges the wind turbine blade to urge the blade-support fixture to move laterally, thereby laterally reorienting the blade upon the consist.

18 Claims, 10 Drawing Sheets

(56) References Cited

U.S. PATENT DOCUMENTS

| | | | |
|---|---|---|---|
| 2013/0343827 A1* | 12/2013 | Schibsbye | F03D 13/40 410/45 |
| 2014/0286723 A1* | 9/2014 | Landrum | B61D 3/16 410/45 |
| 2018/0223811 A1* | 8/2018 | Fletcher | B61D 45/003 |
| 2021/0277875 A1* | 9/2021 | Ferris | B61D 3/08 |

* cited by examiner

WIND TURBINE BLADE REACTION FIXTURE FOR RAILWAY TRANSPORT

BACKGROUND OF THE INVENTION

Related Applications

None.

FIELD OF THE INVENTION

The present invention relates to support fixtures for the transportation of wind turbine blades. More particularly, the present invention relates to support fixtures useful for transporting long wind turbine blades via rail on a consist of flatcars.

DESCRIPTION OF THE RELATED ART

The continued growth of wind power utilization has led to increasingly larger wind turbine structures. This presents a number of challenges in the field of logistics for transporting wind turbine components from the points of manufacturer to the points of utilization. An important mode of transporting wind turbine blades, in particular, is railroad transport. In the case of very long and relatively fragile wind turbine blades, it becomes necessary to join plural railcars together to provide adequate length. This approach presents several logistical challenges relate to the movement, articulation, and clearances along railways.

The assignee of the present disclosure holds a range of US patents that are germane to the logistics of wind turbine blade transportation. These patents are listed below, and the entire contents and teachings of all of these patents are hereby incorporated by reference, in their entirety and for all purposes.

A) U.S. Pat. No. 7,591,621 issued on Sep. 22, 2009 to Landrum et al. for Wind Turbine Blade Transportation System and Method.
B) U.S. Pat. No. 7,670,090 issued on Mar. 2, 2010 to Landrum et al. for Wind Turbine Blade Transportation System and Method.
C) U.S. Pat. No. 8,708,625 issued on Apr. 29, 2014 to Landrum et al. for Wind Turbine Blade Railroad Transportation System and Method.
D) U.S. Pat. No. 8,834,082 issued on Sep. 16, 2014 to Landrum et al. for Wind Turbine Blade Railroad Transportation System and Method.
E) U.S. Pat. No. 9,315,200 issued on Apr. 19, 2016 to Landrum et al. for Wind Turbine Blade Railroad Transportation With Two Axis Translation.
F) U.S. Pat. No. 9,347,426 issued on May 24, 2016 to Landrum et al. for Wind Turbine Blade Railroad Transportation System and Method.
G) U.S. Pat. No. 9,494,140 issued on Nov. 15, 2016 to Sigurdsson for Frame Support Assembly For Transporting Wind Turbine Blades.
H) U.S. Pat. No. 9,567,969 issued on Feb. 14, 2017 to Sigurdsson for Systems and Methods For Transporting Wind Turbine Blades.
I) U.S. Pat. No. 9,790,927 issued on Oct. 17, 2017 to Landrum et al. for Wind Turbine Blade Double Pivot Transportation System and Method.
J) U.S. Pat. No. 10,030,633 issued July 24, 2018 to Sigurdsson for System and Method for Transporting Wind Turbine Blades.
K) U.S. Pat. No. 10,697,437 issued Jun. 30, 2020 to Alvarez et al. for Rotatable Support Fixture for Wind Turbine Blade.

Wind turbine blades lengths now require as many as three standard length rail flatcars joined in a consist of railcars to provide adequate length for transport. For example, a seventy-one meter wind turbine blade necessitates the use of three standard eighty-nine foot flatcars. The flatcars, of course, are capable for movement along railways without special railway clearance consideration because the railcar couplers articulate movement between adjacent flatcars to accommodate track curvature and passage through standard railway clearance profiles, as are understood by those skilled in the art. However, the wind turbine blade resting on such a consist does not articulate and will overhang the sides of the consist to such a degree that standard railway clearance profiles are violated, thereby greatly reducing the possible routes available for transport. It is beneficial to shift the position of the wind turbine blade upon the consist of flatcars during transport, to thereby reduce as much as possible, the degree of overhang beyond the railway clearance profile as a train rounds curved sections of railway track.

Whenever any load on a railcar exceeds the standard railway clearance profile, it becomes incumbent upon logistics professionals to determine the extent of the overhang issues, minimize the extent of the overhang as much as is practicable, and then identify railway routes that can accommodate such overhang. This, of course, reduces the possible railway routes available for such loads, and increases the transportation costs. Thus it can be appreciated that there is a need in the art for improved fixtures designed to minimize the extend of railway profile clearance overhang for long wind turbine blades.

SUMMARY OF THE INVENTION

The need in the art is addressed by the systems and methods of the present invention. The present disclosure teaches a fixture system for railway transport of wind turbine blades that extend longitudinally from a root-end portion though a support region to a tip-end portion, upon a consist of a root-support flatcar, an idler flatcar, and a blade-support flatcar. The system includes a root-support fixture with a root-end support member that engages the wind turbine blade along the root-end portion, and that has a pivot base, that is attached to the root-support flatcar, which supports the root-end support member about a vertical axis of rotation. The system also includes a blade-support fixture with a base frame that has a first lateral guide member, and that is is attached to the blade-support flatcar, and which has a blade sling slung from a support frame, for supportively engaging the wind turbine blade along the support region. The support frame has a second lateral guide member that engages the first lateral guide member to enable lateral movement of the support frame and the blade sling with respect to the base frame. A first and second guide post are attached to the blade-support flatcar, both extending vertically, to intermittently engage a first and second side, respectively, of the tip-end portion of the wind turbine blade to thereby limit lateral movement thereof in a first and second lateral direction. In operation, movement of the consist around a curved railway section urges the wind turbine blade against the first and second guide posts, which urges the wind turbine blade to urge the blade-support fixture to move laterally, thereby laterally reorienting the blade upon the consist and rotating the root support fixture about the vertical axis of rotation. This action also tends to straighten curved portions of the wind turbine blade itself.

In a specific embodiment of the foregoing system, the root-end support member is a blade cradle conformed to the root-end portion shape. In a refinement to this embodiment, a strap is connected to the blade cradle and wrapped about about the root-end portion of the wind turbine blade to secure it in place.

In a specific embodiment of the foregoing system, where the wind turbine blade has a mounting flange at its root end, the root-end support member further includes an extension member with a flange plate at a distal end thereof for connection to the wind turbine blade mounting flange. In a refinement to this embodiment the extension member further includes a jack stand that extends downwardly to engage the root-support flatcar to balance the root support fixture at times when no wind turbine blade is engaged therewith.

In a specific embodiment of the foregoing system, the first lateral guide member is a pair of opposing lateral guide channels and the second lateral guide member is a plurality of rollers attached to the support frame, arranged such that the plurality of rollers engage with, and are guided by, the pair of opposing lateral channels.

In a specific embodiment of the foregoing system, at least a first bump stop is disposed between the base frame and the support frame, to limit the degree of lateral movement therebetween, and to cushion impact at the end of travel therebetween.

In a specific embodiment of the foregoing system, the first guide post and second guide posts are attached to the blade-support flatcar by a blade-guide frame, to limit bending torque applied to the blade-support flatcar.

In a specific embodiment, the foregoing system further includes cylindrical cushions disposed about the first and second guide posts to cushion and protect the wind turbine blade upon engagement therewith.

The present disclosure teaches method for railway transport of wind turbine blades that extend longitudinally from a root-end portion though a support region to a tip-end portion, upon a consist of a root-support flatcar, an idler flatcar, and a blade-support flatcar, using a root-support fixture with a root-end support member and a pivot base, and, a blade-support fixture with a base frame with a first lateral guide member and a blade sling slung from a support frame, where the support frame has a second lateral guide member, and, first and second guide posts. The method includes attaching the pivot base of the root-support fixture to the root-support flatcar and engaging the root-end portion of the wind turbine blade with the root-end support member, which rotatably supports the root-end portion of the wind turbine blade about a vertical axis of rotation. The method further includes attaching the base frame of the blade-support fixture to the blade-support flatcar, engaging the second lateral guide of the support frame with the first lateral guide of the base frame, which enables lateral movement of the support frame with respect to the base frame, and further includes slinging the blade sling from the support frame, and supportively engaging the support region of the wind turbine blade with the blade sling. The method further includes attaching the first and second guide posts to the blade-support flatcar, extending them vertically, so as to intermittently engage a first and second side of the tip-end portion of the wind turbine blade, and limit lateral movement thereof. In operation, movement of the consist about a curved railway section urges the wind turbine blade against the first and second guide posts, thereby urging the wind turbine blade in lateral directions, and further urging the blade-support fixture to move laterally, which laterally reorients the blade on the consist and rotates the root support fixture about the vertical axis.

In a specific embodiment of the foregoing method, the root-end support member is a blade cradle that conforms to the root-end portion shape. In a refinement to this embodiment, a strap is connected to the blade cradle and wrapped about about the root-end portion of the wind turbine blade.

In a specific embodiment of the foregoing method, where the wind turbine blade includes a mounting flange at its root end, the method includes connecting an extension member, which as a flange plate attached to its distal end, to the root-end support member, and connecting the flange plate to the wind turbine blade mounting flange. In a refinement to this embodiment, the method includes extending a jack stand down from the extension member, and connected to the root-support flatcar, which balances the root support fixture when not transporting a wind turbine blade.

In a specific embodiment of the foregoing method, where the first lateral guide member is a pair of lateral guide channels, and the second lateral guide member is a plurality of rollers attached to the support frame, the method includes engaging the plurality of rollers with the pair of opposing lateral channels, to guide the lateral movement therebetween.

In a specific embodiment, the foregoing method includes placing at least a first bump stop between the base frame and the support frame to limit the degree of lateral movement therebetween, and further cushioning impact at the end of travel therebetween.

In a specific embodiment, the foregoing method includes attaching the first guide post and the second guide post to the blade-support flatcar using a blade-guide frame, to limit bending torque applied to the blade-support flatcar.

In a specific embodiment, the foregoing method includes placing cylindrical cushions about the first guide post and the second guide post, thereby cushioning and protecting the wind turbine blade upon engagement therewith.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present teachings so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Those skilled in the art of wind turbine blade logistics, particularly with regard to railroad transport, will be aware of the challenges in loading, securing, and transporting long structures, such as wind turbine blades (also referred to herein as a "blade"). At the time of this writing, commercial wind turbine blades range in length from approximately 48 meters to 71 meters, and longer blades are envisioned by suppliers. As such, these blades are much longer than the typical railcar. For example, the common rail flatcar is about 27 meters in length. Therefore, multiple railcars must be coupled together to provide adequate length to carry a single wind turbine blade, which may require two, three, or even four railcars joined together. The coupling of plural railcars to provide adequate length may hereinafter be referred to as a "consist" of railcars. The blade must be supported on at least two support fixtures and aligned along the longitudinal axis of the consist of railcars. As a side note for this disclosure, an axis generally aligned with the length of a consist of railcars will be referred to as a "longitudinal" axis. An axis that is generally transverse to a longitudinal axis, such as side-to-side of a railcar, will be referred to as a "lateral" axis. And, vertically aligned axes will be referred to as "vertical" axes. For example, the longitudinal axis of a wind turbine blade is generally aligned with the longitudinal axis of a consist of railcars. Although, there may be several degrees of angular misalignment with respect to these reference directions, as will be appreciated by those skilled in the art.

Since two support fixtures, minimum, are required to support a wind turbine blade, and since a consist may include more than two railcars, some of the railcars in a consist may be load bearing cars, referred to as "load" cars, and some railcars may be non load bearing cars, which may also be referred to a "idler" cars. It will be appreciated by those skilled in the art that the total mass borne by a railcar must result in a center of mass that is close to the longitudinal axis of the railcar and of the consist of railcars so as to avoid excessive tipping forces. Sometimes it is necessary to add counterweights to a railcar where the actual load cannot be so aligned. This is sometime the case for long, curved, wind turbine blades.

Longer wind turbine blades are commonly designed with a curved airfoil design, generally toward the tip-end portion of the blade, that 'flattens' out under wind loading. However, during transport, the curved shape, sometimes referred to as a "hockey stick" shape, must be addressed with respect to railway clearances. The logistics of wind turbine blade rail transport are facing increasing clearance issues as the blades become longer, and this challenge is exacerbated where the blade is curved. Considering the curvature of railroad tracks, and the undulations over hills and valleys, and the differences between how a consist of railcars traverse a curved section of rail, as compared to the relatively fixed shape of wind turbine blades, and it can be appreciated that clearance logistics is a major consideration in support fixture design and placement. With a two-point support system as discussed above, and the consist of railcars following a curved track, it can be appreciated that the blade axis generally defines a geometric chord along the curved track, where the ends and center portions of the blade overhang the clearance profile more so than where the track section is straight.

As noted above, wind turbine blades flex and flatten out curved portions during operation on a wind turbine generator, so it can be appreciated that the blade itself can endure dynamic bending forces over years of operation. This feature of the blade is advantageously utilized under the teachings of the present disclosure to reduce the amount of railway clearance profile overhang, which enables a greater range of railroad routing options for logistics professionals. It will also be noted that as a consist of railcars traverses right and left turns, and considering the aforementioned hockey-stick blade curvatures, the amount of overhang at the root end of the blade, the tip end of the blade, and the mid-section of the blade varies with the direction and degree of track curvature. A goal under the present disclosure is to balance these various overhang issues so as to minimize the maximum extent of any one of them. This improves the clearance issues and increases the number of railway routing options. It is also noted that the arrangement of blade load supporting fixtures and blade guiding fixtures can apply lateral forces to the blade, particularly towards the tip-end portion, such that the hockey stick shape is 'straightened' to a degree that is similar to the straightening that occurs under operational wind loads. As the blade rest upon the support fixtures, it will be noted that the curvatures of the blade enhance railway profile clearance in first railway curve direction, such as a right-handed curve, and exacerbates railway profile clearance in the opposite railway curve direction, such as a left-handed curve. The arrangement of support and guide fixtures presented under the teachings of the present disclosure advantageously utilize this characteristic of current wind turbine blades.

Figure 1A:
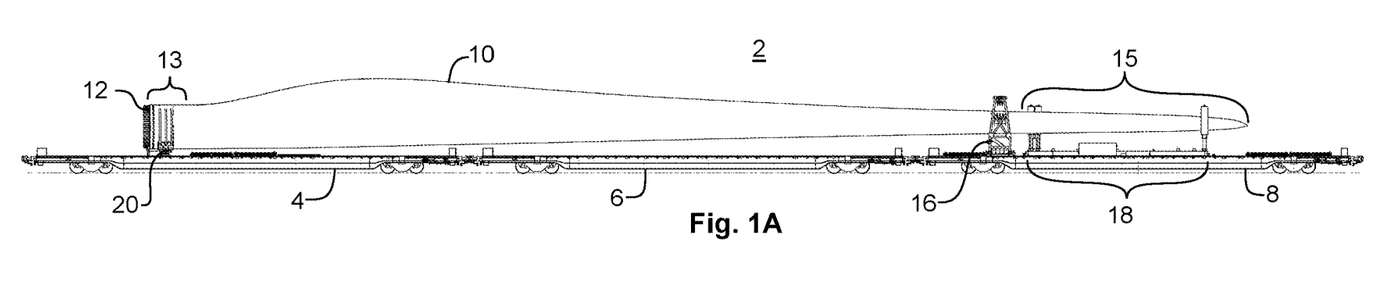
FIGS. 1A, 1B, and 1C are side view drawings of a rail flatcar consist loaded to transport a wind turbine blade according to an illustrative embodiment of the present invention.
Figure 1B:
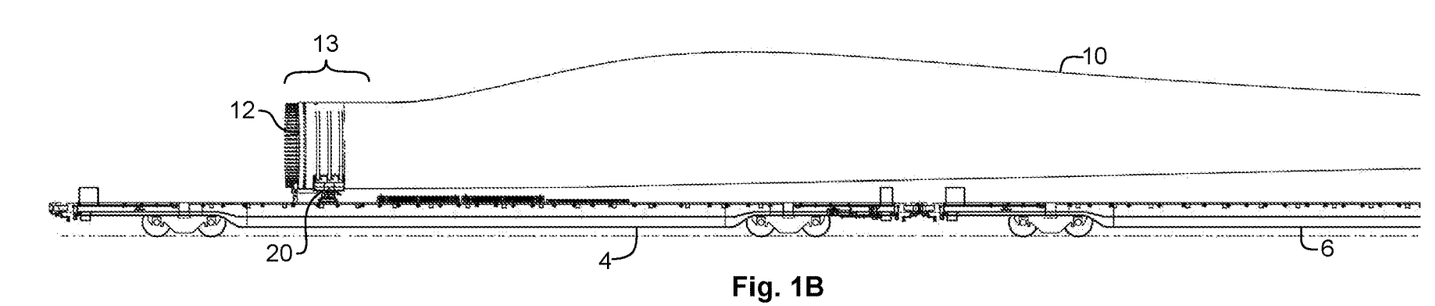
Figure 1C:
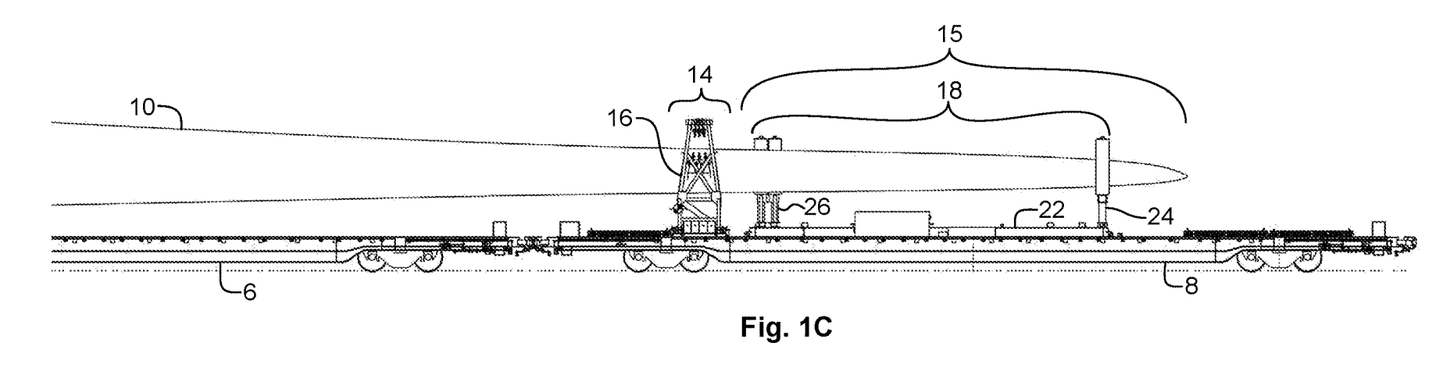

Reference is directed to FIGS. 1A, 1B, and 1C, which are side view drawings of a rail flatcar consist 2 loaded to transport a wind turbine blade 10 according to an illustrative embodiment of the present invention. FIG. 1A illustrates the entire length of the consist 2, including a root-support flatcar 4, an idler flatcar 6, and a blade support flatcar 8. FIGS. 1B and 1C illustrate portions of the consist, which have been enlarged to show more details in the limited space available for the drawing figures. Note that portions of the wind turbine blade 10 are identified for reference in this disclosure. A root end portion 13 is located directly adjacent the root-end mounting flange 12, and is generally cylindrical in cross section. A support region 14 is also identified, and may be located along the mid portion (not labeled), which is designed by the blade 10 manufacturer as a region reinforced to accommodate concentration support loads during transit, as opposed to operational loads. A tip-end portion 15 is also identified, and generally comports with that portion of the blade 10 that has the greatest degree of curvature into the aforementioned hockey stick shape.

The blade 10 in FIGS. 1A, 1B, and 1C is supported along the root-end portion 13 by a root-support fixture 20. The blade 10 is further supported along the support region 14 by a blade support fixture 16. The fixture system of the illustrative embodiment further includes a blade guide fixture 18 that present a first guide post 26 and a second guide post 24, which intermittently engage the tip-end portion 15 of the blade 10 to apply lateral force thereto for blade straightening purposes.

Figure 2A:
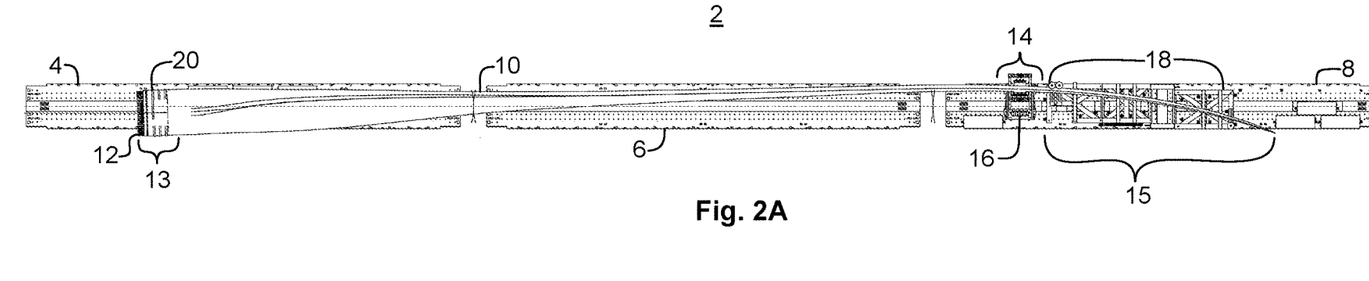
FIGS. 2A, 2B, and 2C are top view drawings of a rail flatcar consist loaded to transport a wind turbine blade according to an illustrative embodiment of the present invention.
Figure 2B:
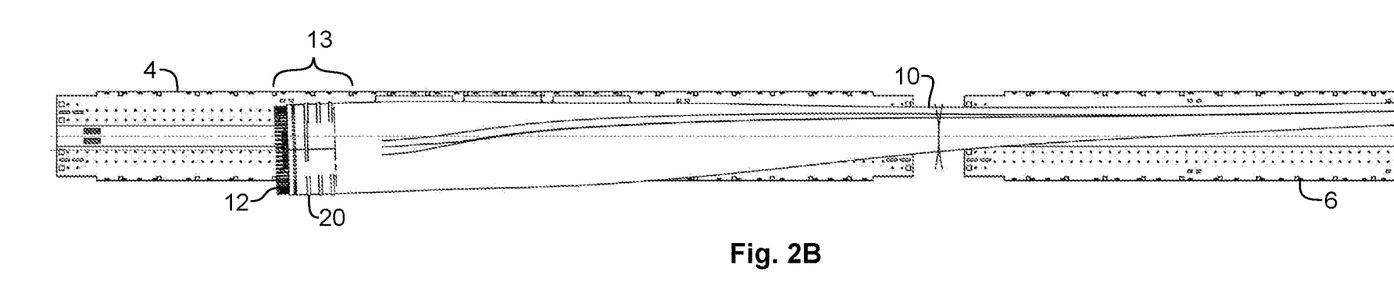
Figure 2C:
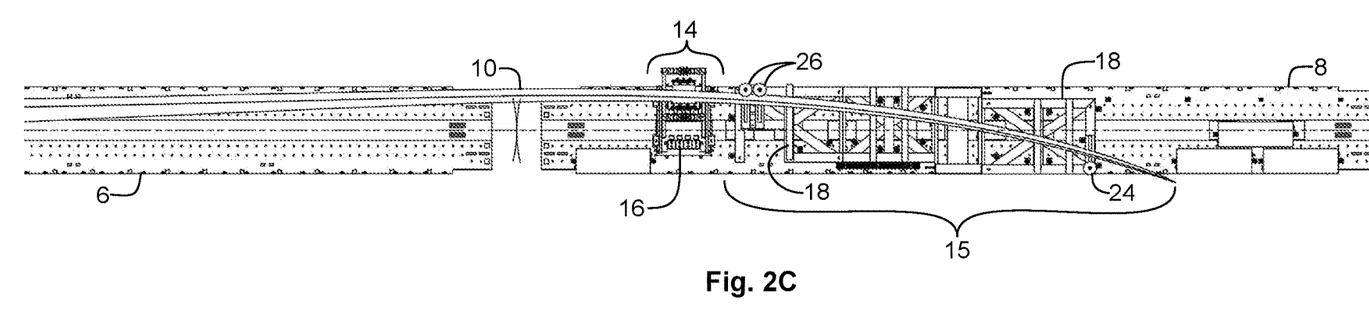

Reference is directed to FIGS. 2A, 2B, and 2C, which are top view drawings of a rail flatcar consist 2 loaded to transport a wind turbine blade 10 according to an illustrative embodiment of the present invention. FIGS. 2A, 2B, and 2C correspond to FIGS. 1A, 1B, and 1C, including the views enlarged for detail. FIGS. 2A and 2C illustrate the aforementioned hockey stick curvature of the blade 10, particularly along the tip-end portion 15. Again, the root end portion 13 is identified, as well as the support region 14, and the tip-end portion 15. The blade 10 in FIGS. 2A, 2B, and 2C is supported along the root-end portion 13 by a root-support fixture 20, and along the support region 14 by a blade support fixture 16. The blade guide fixture 18 is also illustrated, including the first guide post 26 and the second guide post 24. Note that the first guide post 26 in this illustrative embodiment comprises an adjacent pair of post, which serve to mitigate the concentrated loads applied to the blade 10 during transit.

Figures 3, 4, 5:
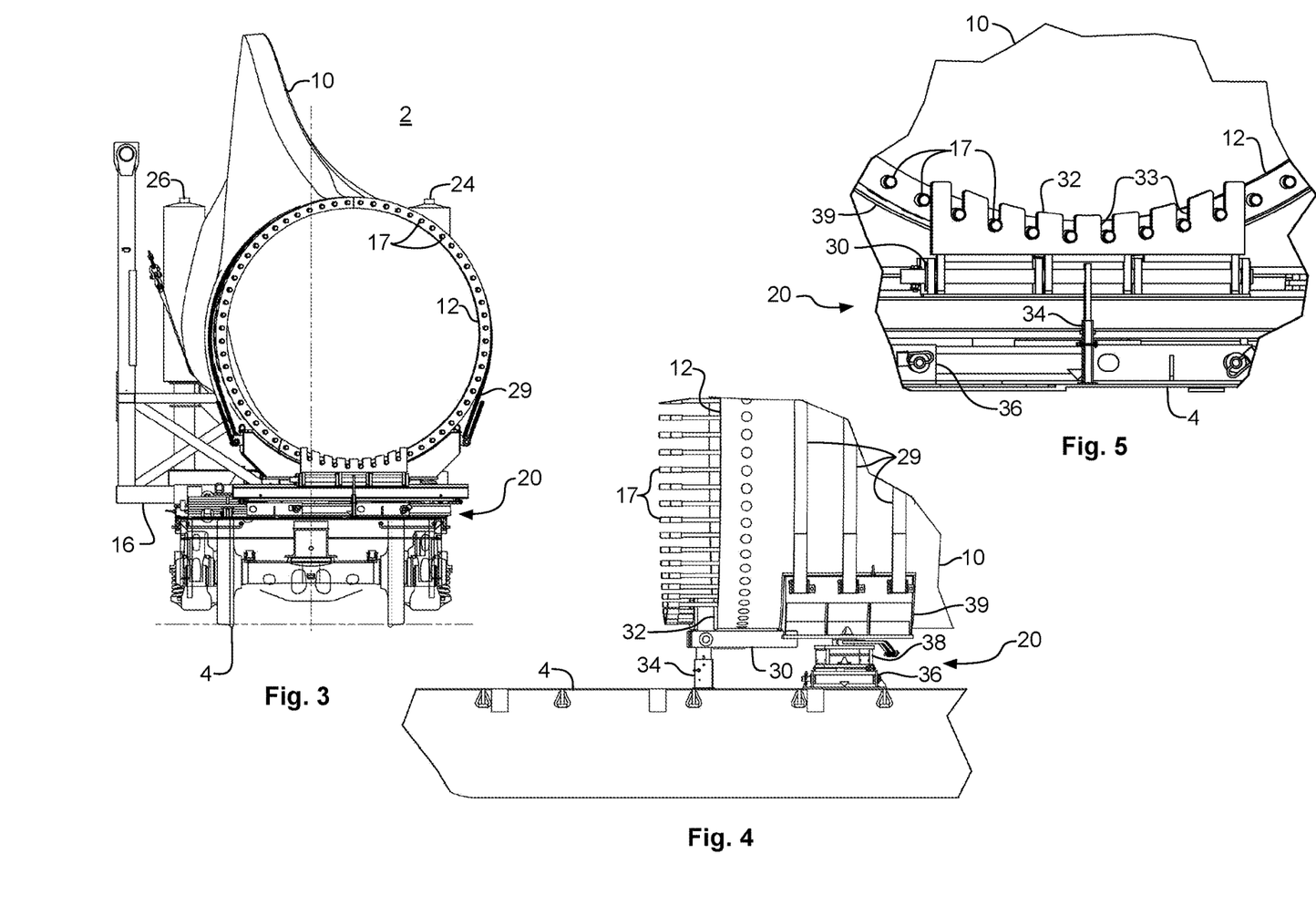
FIG. 3 is an end view drawing of a rail flatcar consist loaded to transport a wind turbine blade according to an illustrative embodiment of the present invention.
FIG. 4 is a partial side view drawing of a root-support fixture supporting a wind turbine blade on a root-support flatcar according to an illustrative embodiment of the present invention.
FIG. 5 is a partial end view drawing of a root-support fixture supporting a wind turbine blade on a root-support flatcar according to an illustrative embodiment of the present invention.

Reference is directed to FIG. 3, which is an end view drawing of a rail flatcar consist 2 loaded to transport a wind turbine blade 10 according to an illustrative embodiment of the present invention. The root-support flatcar 4 is illustrated with the blade 10 supported on the root-support fixture 20. Note that a strap 29 is wrapped about the blade 10 to retain it in place. The root end flange 12 is illustrate, having plural mounting bolts 17 evenly distributed about its circumference, which are used during assembly of the wind turbine (not shown). A portion of the blade-support fixture 16 can be seen, with the first guide post 26 and the second guide post 24 located beyond.

Reference is directed to FIG. 4, which is a partial side view drawing illustrating further details of the root-support fixture 20 supporting a wind turbine blade 10 on the root-support flatcar 4 according to an illustrative embodiment of the present invention. This drawing presents further details the the root-support fixture 20 and its engagement with the wind turbine blade 10, adjacent to the root end flange 12. Note that the mounting bolts 17 are also illustrated, protruding from the root end flange 12. The blade 10 rests on a root-end support member 39, which is a blade cradle that conforms to the shape of the blade in this embodiment. Plural webbing straps 29 are connected to the root-end support member 39 and wrap about the blade 10 to retain it in place. The blade cradle 39 is supported by pivot base 36, 38, which includes an internal pivot (not shown) that enables rotation therebetween about a vertical axis of rotation.

Considering FIG. 4, note that while the blade 10 is strapped 29 to the blade cradle 39, the entire root-support fixture's position is controlled by its engagement with the blade 10, however, those skilled in the art will recognize that longitudinal movement may still occur as the straps 29 could slide along the length of the blade 10. To control this degree of movement, an extension member 30 reaches back from the root-support fixture 20 and presents a flange plate 32, which is bolted 17 to the flange 12 of the blade 10, so as to control longitudinal movement thereof. Note that during unloaded transport, the root-support fixture movement is uncontrolled. To alleviate this issue, the root-support fixture 20 includes a jack stand 34 that selectively connects the extension member 30 to the deck of the flatcar 4, to control movement of the root-support fixture 20, as illustrated.

Reference is directed to FIG. 5, which is a partial end view drawing of a root-support fixture 20 supporting a wind turbine blade 10 on flatcar 4 according to an illustrative embodiment of the present invention. In this view, the flange plate 32 includes plural bolt slots 33, which align with the bolts 17 on the flange 12 of the wind turbine blade 10. Nuts (not shown) are added to secure the flange plate 32 to the flange 12. Note that the blade 10 rests in the blade cradle 39.

The jack stand 34 is illustrated between the extension member 30 and the deck of the flatcar 4. A portion of the root support frame 36 is also visible in this view.

Figure 6:
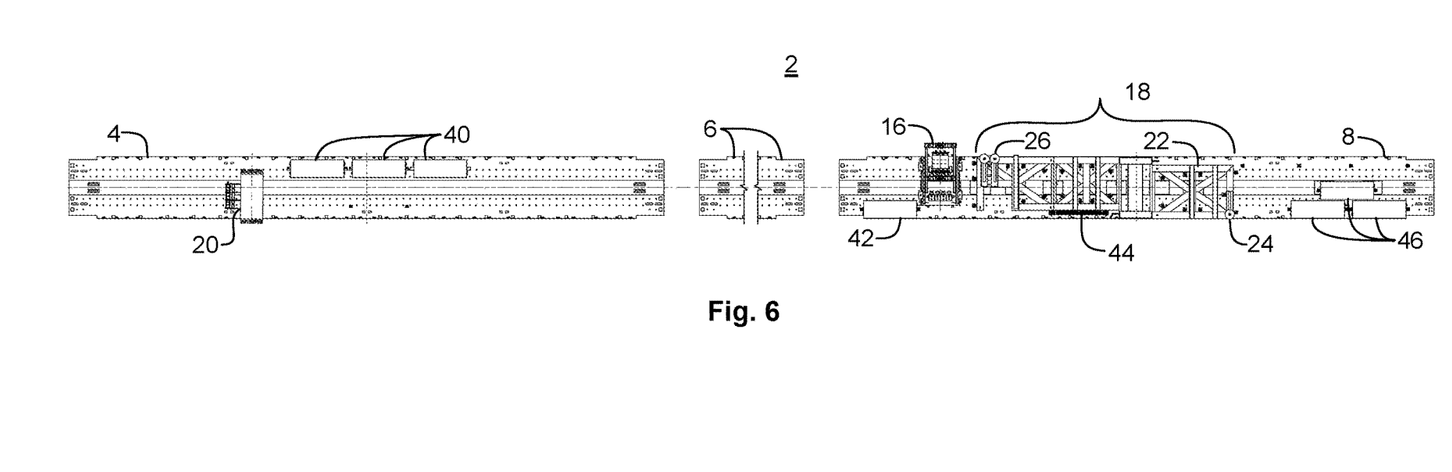
FIG. 6 is a top view drawing of a rail flatcar consist for transporting a wind turbine blade according to an illustrative embodiment of the present invention.
Figure 7:
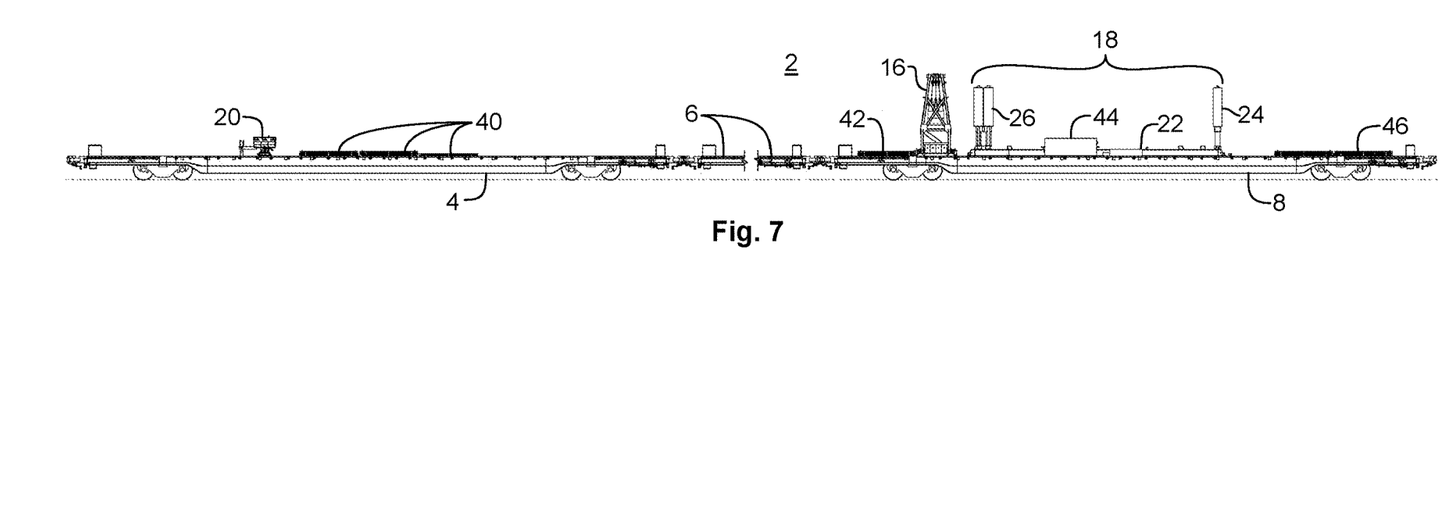
FIG. 7 is a side view drawing of a rail flatcar consist for transporting a wind turbine blade according to an illustrative embodiment of the present invention.

Reference is directed to FIG. 6 and FIG. 7, which are a top view drawing and a side view drawing, respectively, of a rail flatcar consist 2 for transporting a wind turbine blade (not shown) according to an illustrative embodiment of the present invention. These view are similar to FIGS. 2A and 1A, but with the blade removed to show details. The consist includes a root-support flatcar 4, an idler flatcar 6, and a blade-support flatcar 8. The root-support flatcar 4 has the root-support fixture 20 fixed thereto, as illustrated. The precise location of the root-support fixture 20 is dependent upon the particular blade being transported, and the requirements for balancing that blade on the consist 2. Since the root-support fixture 20 is offset from the centerline of the root-support flatcar 4 in this embodiment, plural counterweights 40 are added on the opposite side of the flatcar 4 to balance the load, as will be appreciated by those skilled in the art. The idler flatcar 6 has no fixtures or modifications, serving only to add sufficient length to the consist 2 to accommodate the length of the blade (not shown).

The blade-support flatcar 8 in FIGS. 6 and 7 includes the blade support fixture 16 and a blade guide frame 18 with a pair of vertical blade guide posts 26, 24 fixed thereto. The blade-support flatcar 8 also includes plural counterweights, 42, 44, and 46, which serve to balance the weight of these fixtures, as well as the blade, along the longitudinal centerline of the flatcar 8, as will be appreciated by those skilled in the art. Note that the weight of the blade (not shown) is borne by the root-support fixture 20 and blade-support fixture 16, and that the blade guide posts 26, 24 are located outside of the space between these two support fixtures 20, 16. This arrangement enables the blade guides 26, 24 to both straighten the blade's (not shown) hockey-stick-like tip-end curve, and to urge the blade-support fixture laterally, as will be more fully discussed hereinafter.

Figure 8:
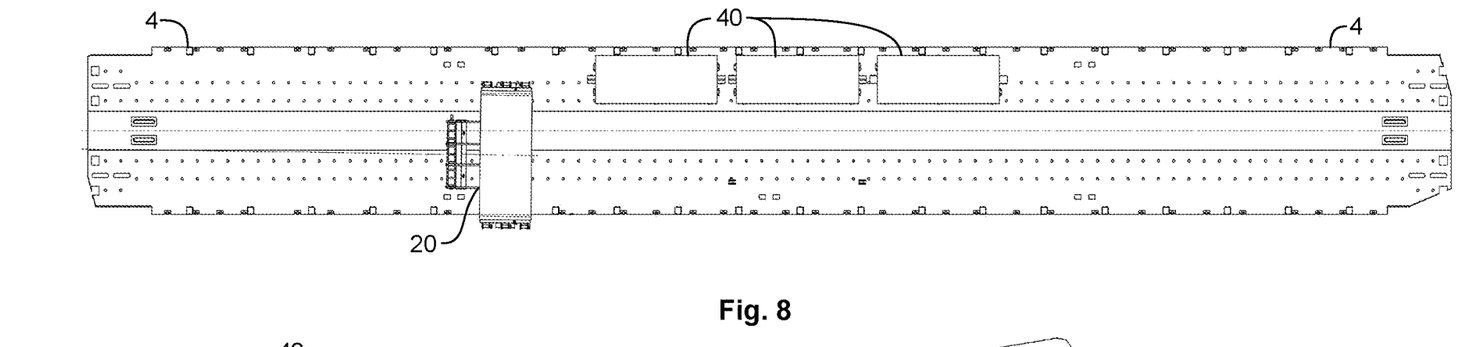
FIG. 8 is a top view drawing of a root-support flatcar according to an illustrative embodiment of the present invention.

Reference is directed to FIG. 8, which is a top view drawing of a root-support flatcar according to an illustrative embodiment of the present invention. The root-support flatcar 4 has the root-support fixture 20 fixed thereto, as illustrated. The precise location of the root-support fixture 20 is dependent upon the particular blade being transported, and the requirements for balancing that blade on the flatcar 4. Since the root-support fixture 20 is offset from the centerline of the root-support flatcar 4 in this embodiment, plural counterweights 40 are added on the opposite side of the flatcar 4 to balance the load, as will be appreciated by those skilled in the art.

Figure 9:
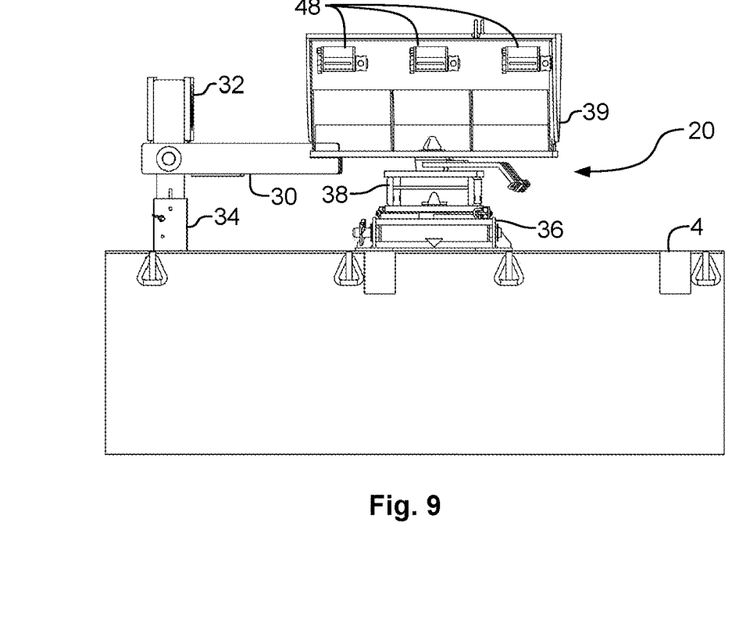
FIG. 9 is a side view drawing of a root-support fixture according to an illustrative embodiment of the present invention.
Figure 10:
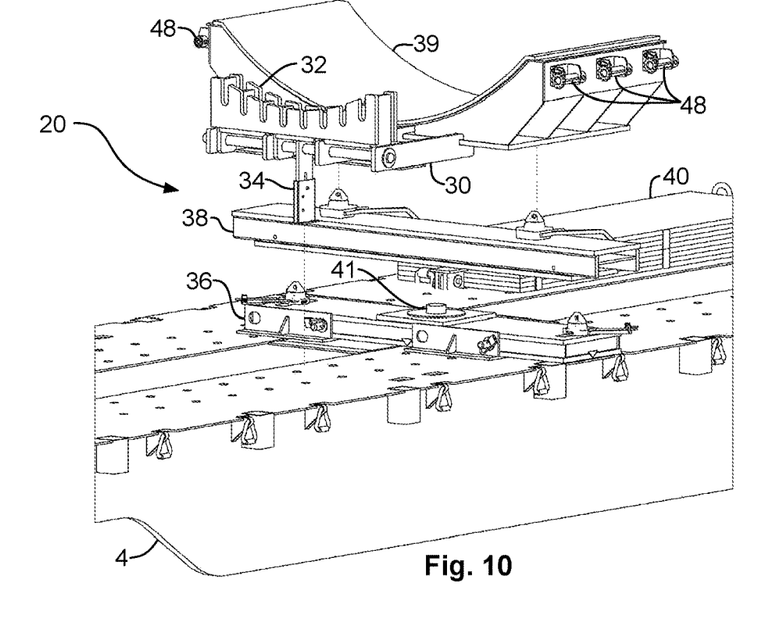
FIG. 10 is an exploded perspective view drawing of a root-support fixture according to an illustrative embodiment of the present invention.

Reference is directed to FIG. 9 and FIG. 10, which are a side view drawing and an exploded perspective view drawing, respectively, of a root-support fixture 20 attached to a root-support flatcar 4 according to an illustrative embodiment of the present invention. The root-support fixture includes of a pivot base comprised of a pivot base frame 36 and a pivot frame 38 that are joined to rotate about a vertical axis of rotation by a pivot 41, as illustrated. The well know twist-lock fasteners may be used to selectively and releasably connect the various elements together, as illustrated. A root-end support member 39, in the form of a blade cradle, is coupled to the pivot frame 38, and rotates together therewith during transport of a wind turbine blade (not shown). The blade cradle 39 includes plural webbing ratchets 48, which provide anchor points and adjustment to the blade webbing straps (not shown) discussed hereinbefore. Extension member 30 is coupled to the blade cradle 30, and presents the aforementioned flange plate 32, which is bolted to the flange 12 (not shown) of the blade 10 (not shown), so as to control longitudinal movement of the blade. The jack stand 34 that selectively connects the extension member 30 to the deck of the flatcar 4, to control movement of the root-support fixture 20, is also illustrated. In FIG. 10, the counterweights 40 are also visible.

Figure 11:
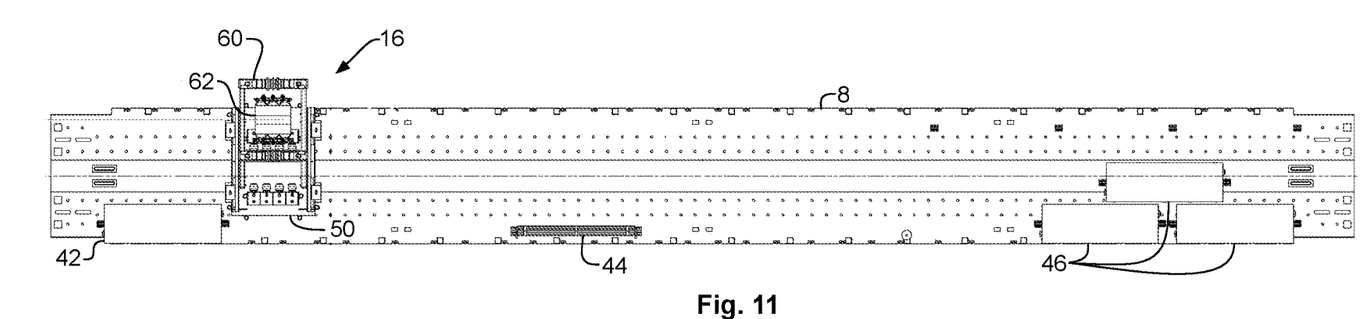
FIG. 11 is a top view drawing of a blade-support flatcar according to an illustrative embodiment of the present invention.

Reference is directed to FIG. 11, which is a top view drawing of a blade-support flatcar 8 according to an illustrative embodiment of the present invention. The blade-support fixture 16 is fixed to the blade-support flatcar 8, and is offset from the longitudinal centerline thereof. For this reason, among others, plural counterweights 42, 44, and 46 are fixed to the blade-support flatcar 8, and positioned to balance loads, as will be appreciated by those skilled in the art. The blade-support fixture 16 is comprised of three major components, which are a base frame 50, a support frame 60, and a blade sling 62, which is slung from the support frame 60. Other fixtures (not shown) are fixed to the blade-support flatcar 8, and will be more fully discussed hereinafter.

Figure 12:
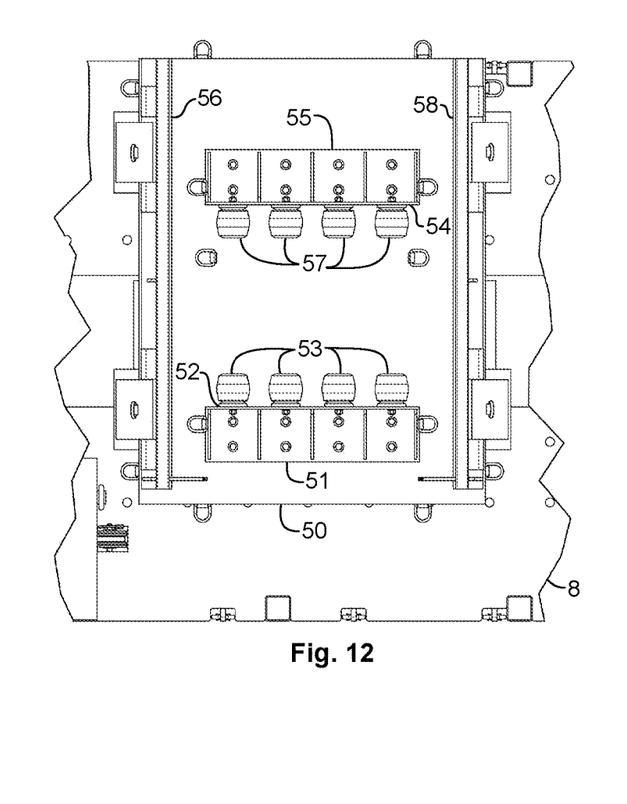
FIG. 12 is a top view drawing of a blade-support fixture base frame according to an illustrative embodiment of the present invention.
Figure 13:
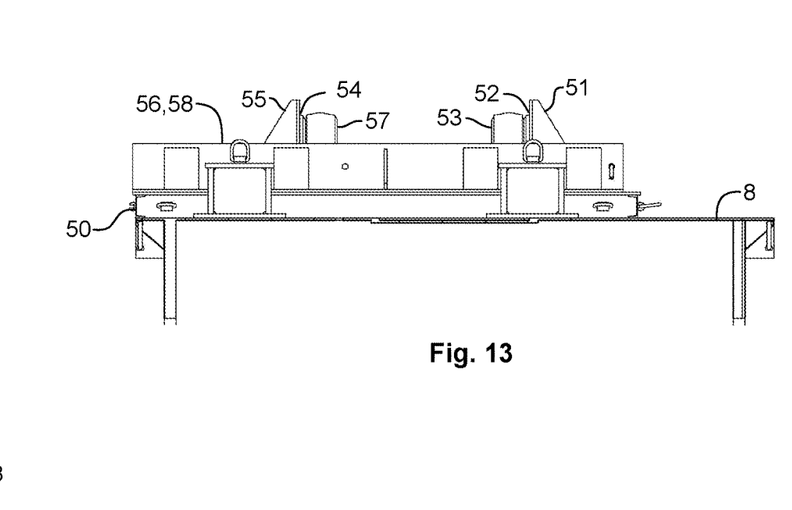
FIG. 13 is an end view drawing of a blade-support fixture base frame according to an illustrative embodiment of the present invention.

Reference is directed to FIG. 12 and FIG. 13, which are a top view drawing and an end view drawing, respectively, of a tip-end support assembly base frame 50 fixed to a blade-support flatcar 8 according to an illustrative embodiment of the present invention. The attachment between the base frame 50 and the flatcar 8 may be by welding or with brackets and removable fasteners. The base frame 50 is a steel plate that includes a pari of parallel lateral guide members 56, 58, which are structural steel C-channels in the illustrative embodiment. The lateral guide members 56, 58 serve as guide support rails for a support frame (not shown), enabling the support frame to shift laterally in position. The extend of the lateral movement is limited by a pair of opposing bump stop assemblies 52, 54, which include mounting brackets 51, 55 and polymeric impact pads 53, 57, as illustrated. Thus, the extent of lateral movement of the support frame (not shown) is limited by the space between the polymeric impact pads 53, 57, as illustrated.

Figure 14:
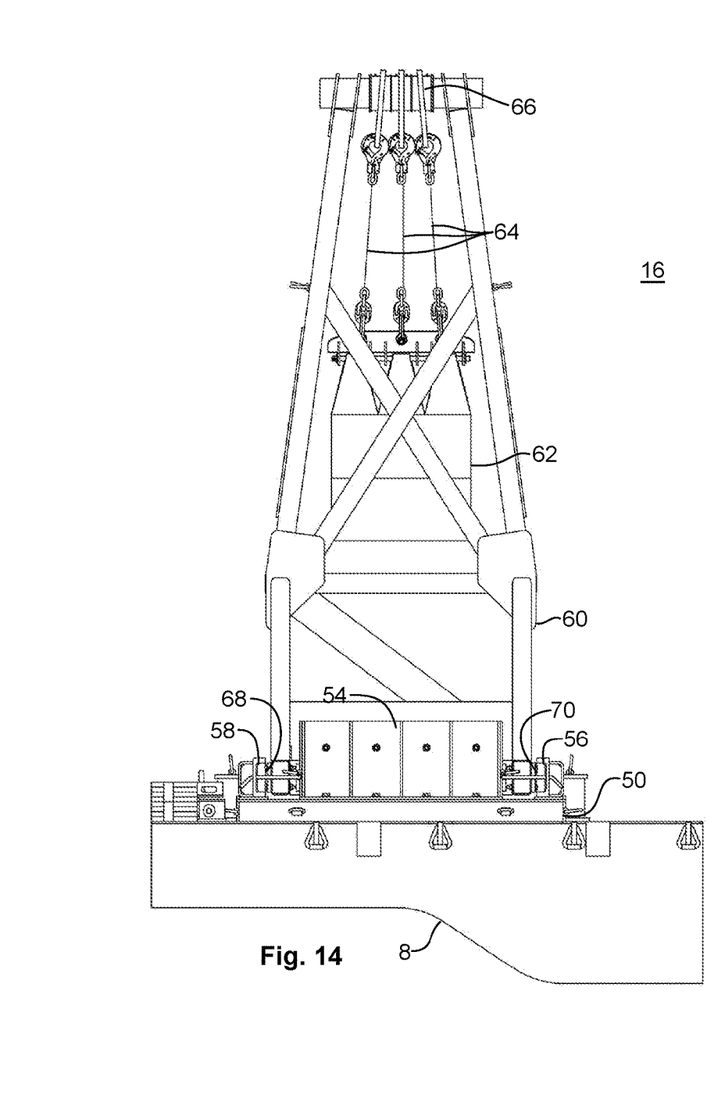
FIG. 14 is a side view drawing of a blade-support fixture according to an illustrative embodiment of the present invention.
Figure 15:
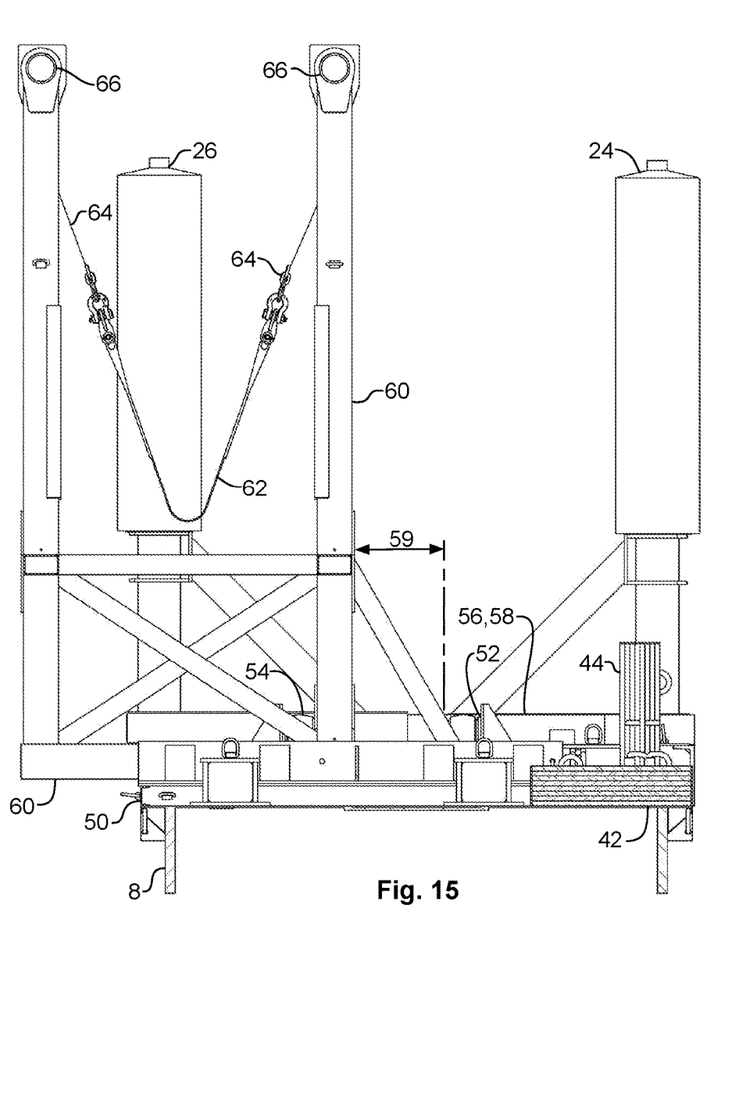
FIG. 15 is an end view drawing of a blade-support fixture and blade-guide posts according to an illustrative embodiment of the present invention.

Reference is directed to FIG. 14 and FIG. 15, which are a side view drawing and an end view drawing, respectively, of a blade-support fixture 16 attached to a blade-support flatcar 8 according to an illustrative embodiment of the present invention. The base frame 50 is attached to the deck of the blade-support flatcar 8, and includes a pair of lateral guide members 56, 58, which are opposingly aligned C-channels rails in this embodiment. The blade-support fixture 16 includes a support frame 60 that is fabricated from mild steel structural shapes, tubes and plates, as illustrated. Along the lower side portions of the support frame 60 are plural rollers 68, 70, which correspondingly engage the lateral guide members 56, 58 to thereby define a laterally aligned path of travel 59 of the support frame 60. Opposing bump stops 52, 54 limit the extend of the path of travel 59, as illustrated. This this arrangement, lateral forces against the wind turbine blade (not shown) urge the blade laterally, with the extend of lateral movement limited by the path of travel 59.

The support frame 60 extends upwardly to sling mounts 66 on either side thereof, which support a webbing material sling 62 slung therefrom using plural chain assemblies 64 in the illustrative embodiment. Note that other sling materials could be employed, using either natural or man-made materials of suitable strength, as will be appreciated by those skilled in the art. Note that in FIG. 15, some of the aforementioned counterweights 42, 44 can be seen, as well as the vertical blade guide posts 24, 26, which will be more fully discussed hereinafter.

Figure 16:
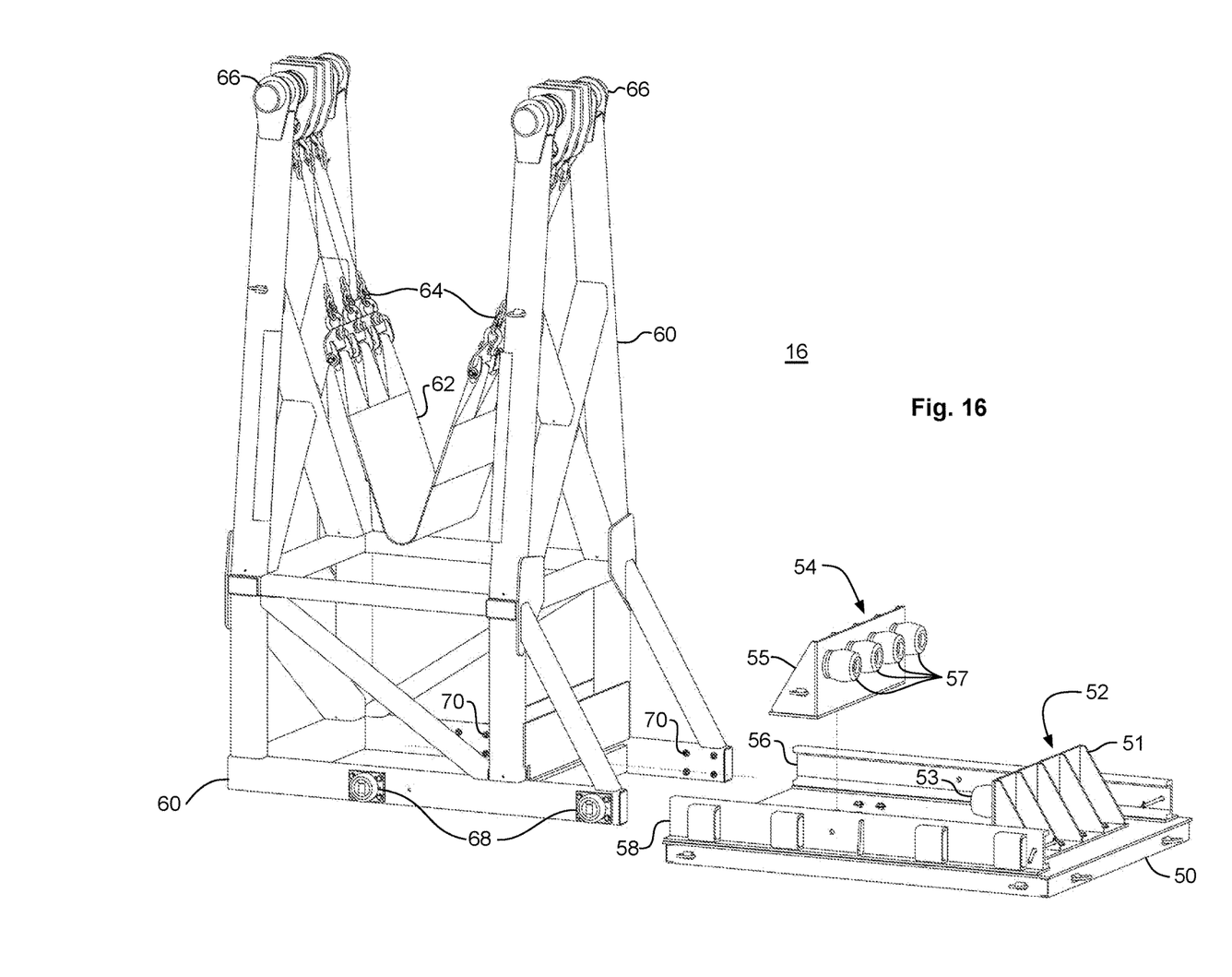
FIG. 16 is an exploded perspective view drawing of a blade-support fixture according to an illustrative embodiment of the present invention.

Reference is directed to FIG. 16, which is an exploded perspective view drawing of a blade support fixture 16 according to an illustrative embodiment of the present invention. This view show further details of the assembly of the blade support fixture 16. The base frame 50 includes a first lateral guide member 56, 58, which are a pair of opposingly orient C-channels, as illustrated. A pair of opposing bump stop assemblies 52, 54 are fixed to the base frame 50 and limit the lateral path of movement of the support frame 60. Note that each bump stop 52, 54 includes an angle bracket 51, 55 and plural polymeric impact cushions 53, 57, as illustrated. Along the lower sides of the support frame 60 are second lateral guide members in the form of plural industrial rollers 70, 68, which rollingly engage the first lateral guide members 56, 58, respectively. The support frame 60 extends upwardly to sling mounts 66 on either side thereof, which support a webbing material sling 62 slung therefrom using plural chain assemblies 64 in the illustrative embodiment.

Figure 17:
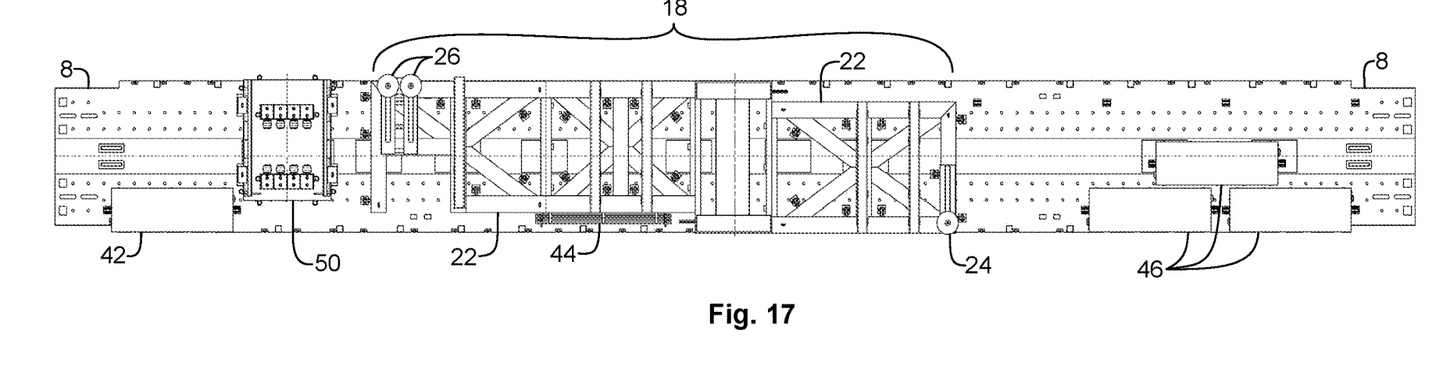
FIG. 17 is a top view drawing of a blade-support flatcar according to an illustrative embodiment fo the present invention.
Figure 18:
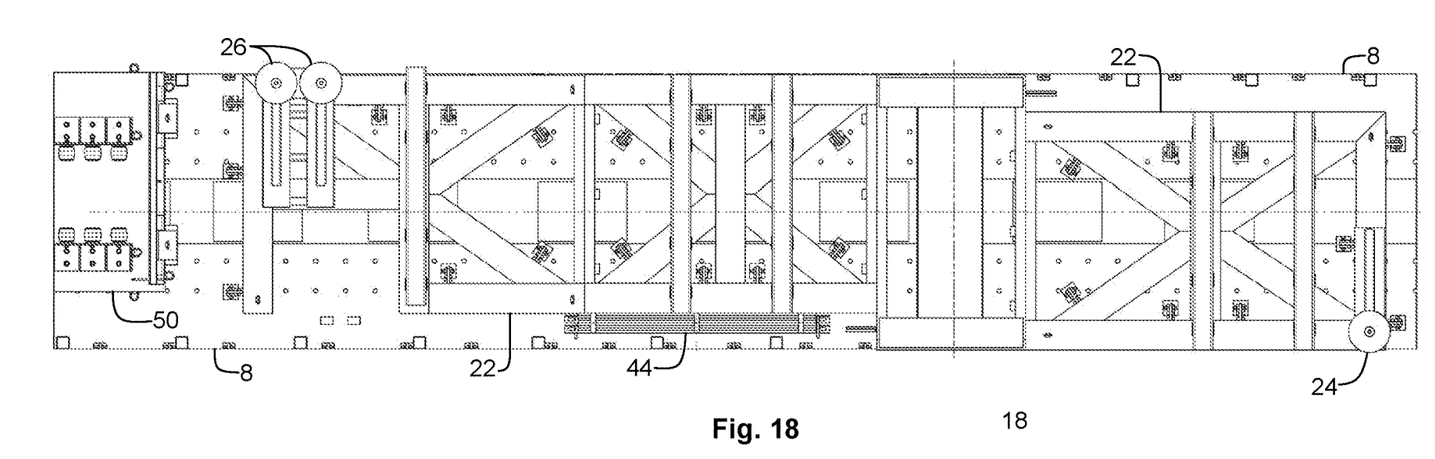
FIG. 18 is a top view drawing of a blade-guide frame according to an illustrative embodiment of the present invention.

Reference is directed to FIG. 17 and FIG. 18, which are top view drawings of a blade-support flatcar 8 according to an illustrative embodiment fo the present invention. FIG. 18 is a somewhat enlarged view for added details. These view corresponds to the view of FIG. 11, but add details of the blade guide assembly 18. In FIGS. 17 and 18, The blade guide assembly 18 includes a blade guide frame 22, which is fabricated from mild steel structural sections and fixed to the flatcar 8 deck with suitable brackets, and a pair of vertically oriented guide posts 24, 26, extending upwardly therefrom. FIG. 18 also illustrates plural counterweights 42, 44, 46, as discussed hereinbefore.

Figure 19:
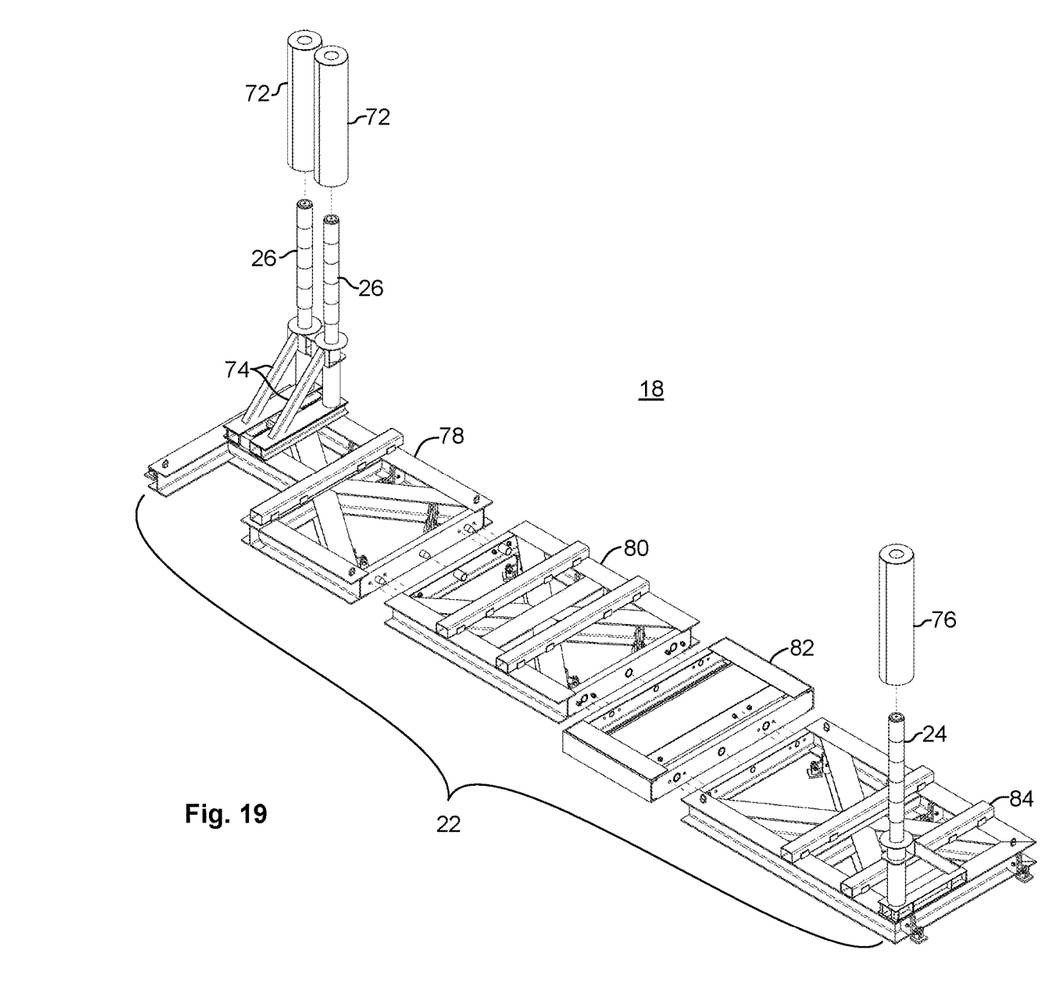
FIG. 19 is an exploded perspective view drawing of a blade guide frame and blade-guide post assembly according to an illustrative embodiment of the present invention.

Reference is directed to FIG. 19, which is an exploded perspective view drawing of a blade guide assembly 18, consisting of a blade guide frame 22 and blade-guide posts 24, 26 according to an illustrative embodiment of the present invention. The blade guide frame 22 serves to resist bending and torque loads applied by the blade (not shown) against the blade guide posts 24, 26 during transit, particularly prevalent when rounding tight curves in the railway. Otherwise, those loads would be borne by the flatcar (not shown). The condition of the flatcar is cannot be known for certain, so this design approach assures competent structural integrity. The blade guide frame comprises plural sub-frames 78, 80, 82, and 84 fabricated from structure steel shapes, which are specified for convenience in fabrication, transport, and assembly in field operations. The sub-frames are connected to one another at the loading site using various alignment pins, bolt sets and brackets, as will be appreciated by those skilled in the art.

FIG. 19 also illustrates the blade guide posts 24, 26, which are steel tubing sections rigidly fixed to the blade guide frame 22 by welded connection. Blade guide post 26 comprises a pair of vertically aligned steel tubes, welded and braced 74 against bending. This guide post 26 is located closest to the blade-support fixture (not shown), so it resists the higher lateral loads. Each of the blade guide posts 24, 26 is padded with a tubular closed cell polymeric wrap, which serves to protect the blade (not shown) surface when engaged therewith. A tubular pad is preferred because it tends to rotate on the blade guide post on the manner of a wheel, which prevents the pad from dragging on the blade surface, which may otherwise damage the finish of the blade (not shown).

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A fixture system for railway transport of a wind turbine blade that extends longitudinally from a root-end portion though a support region to a tip-end portion, upon a consist of a root-support flatcar, an idler flatcar, and a blade-support flatcar, comprising:
   a root-support fixture having a root-end support member for engaging the wind turbine blade along the root-end portion, and having a pivot base, for attachment to the root-support flatcar, that rotatably engages said root-end support member about a vertical axis of rotation;
   a blade-support fixture having a base frame with a first lateral guide member for disposition upon the blade-support flatcar, and having a blade sling slung from a support frame, for supportively engaging the wind turbine blade along the support region, said support frame having a second lateral guide member that engages said first lateral guide member to thereby enable lateral movement of said support frame and said blade sling with respect to said base frame;
   a first guide post for fixed attachment to the blade-support flatcar, extending vertically to intermittently engage a first side of the tip-end portion of the wind turbine blade to thereby limit lateral movement thereof in a first lateral direction, and
   a second guide post fixed to the blade-support flatcar, extending vertically to intermittently engage a second side of the tip-end portion of the wind turbine blade to thereby limit lateral movement thereof in a second lateral direction, and wherein
   movement of the consist about a curved railway section urges the wind turbine blade against said first guide post or said second guide post, which urges the wind turbine blade to urge said blade-support fixture to move laterally, thereby laterally reorienting the blade upon the consist and rotating said root support fixture about said vertical axis of rotation.

2. The fixture system of claim 1, and wherein:
   said root-end support member is a blade cradle conformed to the root-end portion shape.

3. The future system of claim 2, and further comprising:
   a strap connected to said blade cradle for wrapping about about the root-end portion of the wind turbine blade.

4. The fixture system of claim 1, and wherein the wind turbine blade includes a mounting flange at the root end thereof, and wherein:
   said root-end support member further includes an extension member with a flange plate at a distal end thereof for connection to the wind turbine blade mounting flange.

5. The fixture system of claim 4, and wherein:
   said extension member further includes a jack stand that extends downwardly to engage the root-support flatcar to thereby balance said root support fixture while no wind turbine blade is engaged therewith.

6. The fixture system of claim 1, and wherein:
   said first lateral guide member is a pair of lateral guide channels, and wherein
   said second lateral guide member is a plurality of rollers attached to said support frame, and wherein said plurality of rollers engage with, and are guided by, said pair of opposing lateral channels.

7. The fixture system of claim 1, and further comprising:
at least a first bump stop disposed between said base frame and said support frame, to thereby limit the degree of lateral movement therebetween, and to cushion impact at the end of travel therebetween.

8. The fixture system of claim 1, and wherein:
said first guide post and second guide posts are attached to the blade-support flatcar by a blade-guide frame, to thereby limit bending torque applied to the blade-support flatcar.

9. The fixture system of claim 1, and further comprising:
cylindrical cushions disposed about said first guide post and said second guide post to thereby cushion and protect the wind turbine blade upon engagement therewith.

10. A method for railway transport of a wind turbine blade that extends longitudinally from a root-end portion though a support region to a tip-end portion, upon a consist of a root-support flatcar, an idler flatcar, and a blade-support flatcar, using a root-support fixture having a root-end support member and a pivot base, a blade-support fixture having a base frame with a first lateral guide member and a blade sling slung from a support frame, the support frame having a second lateral guide member, and first and second guide posts, the method comprising the steps of:
attaching the pivot base of the root-support fixture to the root-support flatcar and engaging the root-end portion of the wind turbine blade with the root-end support member, thereby rotatably supporting the root-end portion of the wind turbine blade about a vertical axis of rotation;
attaching the base frame of the a blade-support fixture to the blade-support flatcar, engaging the second lateral guide of the support frame with the first lateral guide of the base frame, thereby enabling lateral movement of the support frame with respect to the base frame, and slinging the blade sling from the support frame, and supportively engaging the support region of the wind turbine blade with the blade sling;
attaching the first guide post to the blade-support flatcar, extending vertically, thereby intermittently engaging a first side of the tip-end portion of the wind turbine blade, and thereby limiting lateral movement thereof in a first lateral direction;
attaching the second guide post to the blade-support flatcar, extending vertically, thereby intermittently engaging a second side of the tip-end portion of the wind turbine blade, and thereby limiting lateral movement thereof in a second lateral direction, and wherein
movement of the consist about a curved railway section urges the wind turbine blade against the first guide post or the second guide post, thereby urging the wind turbine blade in the first or second lateral direction, and further urging the blade-support fixture to move laterally, thereby laterally reorienting the blade upon the consist and rotating the root support fixture about the vertical axis of rotation.

11. The method of claim 10, and wherein the the root-end support member is a blade cradle conformed to the root-end portion shape.

12. The method of claim 11, and further comprising the steps of:
wrapping a strap about about the root-end portion of the wind turbine blade, and connecting the strap to the blade cradle.

13. The method of claim 10, and wherein the wind turbine blade includes a mounting flange at the root end thereof, and further comprising the steps of:
connecting an extension member, having a flange plate attached to a distal end thereof, to the root-end support member, and
connecting the flange plate to the wind turbine blade mounting flange.

14. The method of claim 13, and further comprising the steps of:
extending a jack stand downwardly from the extension member, and engaging the root-support flatcar, thereby balancing the root support fixture while no wind turbine blade is engaged therewith.

15. The method of claim 10, and wherein the first lateral guide member is a pair of lateral guide channels, and the second lateral guide member is a plurality of rollers attached to said support frame, and further comprising the steps of:
engaging the plurality of rollers with the pair of opposing lateral channels, thereby guiding the lateral movement therebetween.

16. The method of claim 10, and further comprising the steps of:
disposing at least a first bump stop between the base frame and the support frame, thereby limiting the degree of lateral movement therebetween, and cushioning impact at the end of travel therebetween.

17. The method of claim 10, and further comprising the steps of:
attaching the first guide post and the second guide post to the blade-support flatcar using a blade-guide frame, thereby limiting bending torque applied to the blade-support flatcar.

18. The method of claim 10, and further comprising the steps of:
disposing cylindrical cushions about the first guide post and the second guide post, thereby cushioning and protecting the wind turbine blade upon engagement therewith.

* * * * *